United States Patent [19]

Knight

[11] 4,074,010

[45] Feb. 14, 1978

[54] CERAMIC-PAINT COATINGS

[75] Inventor: Clifford J. Knight, Transfer, Pa.

[73] Assignee: Lyle V. Anderson, Pittsburgh, Pa.; a part interest

[21] Appl. No.: 617,249

[22] Filed: Sept. 29, 1975

Related U.S. Application Data

[63] Continuation-in-part of Ser. No. 576,255, May 12, 1975, abandoned.

[51] Int. Cl.² .............. B32B 27/00; B32B 17/06; B32B 9/04; B32B 13/04
[52] U.S. Cl. .................. 428/422; 427/192; 427/193; 427/195; 427/203; 427/204; 427/376 A; 427/376 C; 427/376 D; 427/407 R; 427/409; 428/421; 428/426; 428/446; 428/450; 428/539; 427/205
[58] Field of Search .............. 427/203, 204, 205, 202, 427/376 A, 376 C, 376 D, 192, 193, 195, 407 R, 409; 428/421, 422, 446, 539, 411, 426, 450

[56] References Cited

U.S. PATENT DOCUMENTS

| | | | |
|---|---|---|---|
| 1,784,392 | 12/1930 | Rowland | 264/61 |
| 1,955,572 | 4/1934 | Adler et al. | 427/203 X |
| 2,261,638 | 11/1941 | Beach | 427/203 X |
| 2,290,905 | 7/1942 | Butler | 427/192 X |
| 2,330,365 | 9/1943 | Jackson | 427/203 X |
| 2,337,691 | 12/1943 | Stettinius et al. | 427/193 |
| 2,624,823 | 1/1953 | Lytle | 427/123 X |
| 2,774,681 | 12/1956 | Huppert | 427/204 X |
| 2,864,721 | 12/1958 | King et al. | 427/376 |
| 2,925,831 | 2/1960 | Welty et al. | 427/203 X |
| 3,030,223 | 4/1962 | Alstad et al. | 427/203 X |
| 3,035,937 | 5/1962 | Baldauf et al. | 427/376 X |
| 3,047,421 | 7/1962 | Taylor | 428/422 |
| 3,080,253 | 3/1963 | Dietz et al. | 427/203 X |
| 3,098,758 | 7/1963 | Sullivan | 427/205 X |
| 3,140,195 | 7/1964 | Nagel | 427/203 X |
| 3,207,617 | 9/1965 | Baker | 427/203 X |
| 3,325,303 | 6/1967 | Lant et al. | 427/203 X |
| 3,338,732 | 8/1967 | Holcomb | 427/203 X |
| 3,370,977 | 2/1968 | Anderson et al. | 427/126 X |
| 3,393,086 | 7/1968 | Keating | 428/422 |
| 3,476,584 | 11/1969 | Randklev et al. | 427/376 X |
| 3,649,354 | 3/1972 | Velde | 427/203 X |
| 3,928,703 | 12/1975 | Cook | 428/422 |
| 3,970,627 | 7/1976 | Seymus | 260/42.14 Y |

FOREIGN PATENT DOCUMENTS 219,936   5/1957   Australia.

*Primary Examiner*—Ronald H. Smith
*Assistant Examiner*—Shrive P. Beck
*Attorney, Agent, or Firm*—Thomas H. Murry

[57] ABSTRACT

This disclosure relates to multi-layer coatings of ceramic paint and teaches how they may be made and used. It discloses that such coatings are made by applying finely-divided material, such as -100 micron silica, to ceramic paint while it is wet, curing without fusing the paint, and then applying another coat of ceramic paint. Many uses, in places where known ceramic coatings or claddings have exhibited poor resistance, adhesion, or life, are disclosed.

24 Claims, No Drawings

CERAMIC-PAINT COATINGS

CROSS-REFERENCE TO RELATED APPLICATION

This application is a continuation-in-part of application Ser. No. 576,255, filed May 12, 1975, now abandoned.

BACKGROUND OF THE INVENTION

1. Field of the Invention

This invention relates to articles having ceramic-paint coatings and to methods of making such articles.

2. Description of the Prior Art

There are several known kinds of water-base or oil-base ceramic paint, each of proprietary composition. For many purposes, such paint is unsatisfactory when applied as a single coat. Accordingly, it has occurred to those skilled in the art that best results might be obtained by using more than one coat. Efforts have been made to apply a second coat of paint, but it has developed that there is a severe problem in getting the second coat of ceramic paint to adhere to the first. Many approaches were tried, including roughening of the first coat, slower baking, using heavier coats, using lighter coats, and treatments of the surface of the first coat with various media, all these approaches proving to no avail. Thus, even when the ceramic paint has been applied with the greatest of care, it has frequently been difficult or impossible to avoid the occurrence of one or more small pinholes in the coating that cause it to fail. The likelihood of such pinholes is increased if the ceramic paint is cured rapidly, so that water or oil becomes trapped beneath an early-hardening exterior layer of the ceramic paint; at the same time, the use of slow curing at relatively low temperatures for prolonged times is relatively expensive, and at that, it does not provide a complete answer to the problem.

Yet another drawback of most of the known ceramic paints is that after having been applied and cured, they must be cooled rather slowly to room temperature, as they will crack if simply removed from the furnace in which they are cured and permitted to air-cool. This adds undesirably to the time and expense involved in protecting an article with the use of such ceramic paints, and it would accordingly be advantageous to provide a ceramic-paint-base coating that would withstand the thermal shock of an air-cool without exhibiting such cracking.

BRIEF SUMMARY OF THE INVENTION

In accordance with the invention, the above-indicated drawbacks of known ceramic-paint coatings are overcome by applying to a substrate wetted with ceramic paint a substance such as silica in finely-divided form, such as about 100 microns maximum dimension, and then, after curing without fusing the ceramic paint in the usual way, e.g., by baking for about 5 to 10 minutes at about 200° –500° F, and cooling, applying a second coat of ceramic paint and curing it the same way. Substrates, ceramic paints, and the finely-divided substance used will vary considerably, depending upon the desired application. Even without the application of the second coat of ceramic paint and the curing thereof, there is an advantge from treating the wet paint surface with finely-divided material, namely, that cracking and pinholing upon air-cooling from the curing temperature is avoided. The invention thus makes possible a wide variety of articles displaying improved resistance to heat and chemicals, despite rather rapid changes in environment temperature.

DESCRIPTION OF PREFERRED EMBODIMENTS

In general terms, the invention comprises applying to a suitable substrate a first coat of ceramic paint, applying to the paint coating a suitable material in finely-divided form, curing the resultant coating without fusing the ceramic paint, and then applying a second coat of ceramic paint and again curing without fusing the ceramic paint. If a third coat is to be applied, a suitable material in finely-divided form is again applied to the second coat of paint while it is still wet and before it is cured. In this way, it is possible to obtain ceramic-coated objects that have two or a suitable greater number of coats of ceramic paint and have accordingly greater resistance to pinholing and consequent early failure. Even without the application of the second coat of ceramic paint, there is the advantage that an object ceramic-painted and then treated with, e.g., finely-divided silica before being cured, will resist the thermal shock of air-cooling immediately from a curing temperature without developing cracking, and this advantage is also retained when, as is preferred in most instances, at least a second coat of ceramic paint is applied to an object that has been once painted with ceramic paint and then treated with silica or other suitable substance in accordance with the invention. Moreover, in relation to single-coat coatings, the finely-divided material serves to close pinholes, and thus it may be possible to improve service performance of single-coated ceramic-painted objects by applying finely-divided material in accordance with the invention.

Substrates that may be treated in accordance with the invention comprise a great number of substances that are solid at room temperature and the temperature of intended service, including most metals, certain glasses, refractories, ceramics, cemented and uncemented asbestos products, fibers, fabrics, and certain resins.

The invention is not limited to use with certain paint of any particular kind, it being equally applicable with both the water-base ceramic paints and the oil-base ceramic paints. Those skilled in the art of formulating ceramic paints will appreciate that these paints take various forms, depending upon the intended use, the usual and maximum service temperatures encountered therein, the expansion coefficient of the substrate, the desired color, etc. Some such paints are intended for use in applications where the service temperature does not exceed about 500° F, whereas others are intended to withstand service at such temperatures as 4500°–6300° F or possibly higher. Two ceramic paints suitable for practicing one embodiment of this invention are paints such as that sold commercially under the trademarks "Lithoid G-125" and "LITHOID C-ZS" by Industrial Infra-Red, Inc. of Sharon, Pennsylvania, but several others are known to those skilled in the art. The above-mentioned ceramic paint "Lithoid G-125" is of the type that enters into reaction with an iron or aluminum substrate, forming a chemical bond therewith, but it will be understood that the invention also finds use with other ceramic paints that do not react with the substrate but are rather merely mechanically bonded thereto. It is characteristic of some of the known ceramic paints that upon curing they exhibit a surface grain size of between about 3 and 1000 millimicrons average diameter, i.e., they are exceedingly fine-grained of surface and thus tend strongly to resist adhering to other substances placed thereon after curing, and this unfortunately precludes applying further coats of ceramic paint.

The ceramic paint is applied to the substrate in any of several ways, such as brushing, dipping or spraying. A wet coating of about 0.002 to 0.006 inch in thickness may thus be produced.

The substance in finely-divided form that is applied to the wet ceramic-painted substrated has been mentioned above as possibly being silica of 100 microns maximum dimension. Materials somewhat finer, for example, about 40 microns maximum dimension, may be used. A great variety of materials other than silica may be used, among which may be mentioned the rare earths and the powdered or finely-ground metals and oxides thereof. The use of borides, carbides, silicides, sulfides, or nitrides of such metals that are stable at intended service temperature will also be understood as coming within the scope of the present invention as substitutes for the silica. Suitable mixtures containing at least one of the above-mentioned substances in a suitable and effective amount may be used. Resins and/or polymers in finely-divided form, alone or mixed with materials mentioned above, may be used. The material used will depend upon the intended use and intended service temperature; for example, with coatings for use at 5000° F, zirconium metal powder is especially suitable, but other refractory-metal powders can be used. Zirconium oxide powder is particularly suitable.

So far as the principle of the invention is concerned, the finely-divided material may be of any desired degree of fineness, down into the submicron range, but it is naturally more expensive to use such very finely-divided powders, and especially where the material is a metal, pyrophoricity becomes increasingly a problem as the material becomes finer.

The manner of the application of the finely-divided substance to the paint-wetted substrate may vary, depending upon the intended use. In many instances, it will suffice to sprinkle the finely-divided substance onto the paint-wet surface until it will absorb no more, the excess being tapped off, but other techniques such as the use of a flock gun will suggest themselves as equivalents to those skilled in the art, and the use of somewhat less of the finely-divided substance than in indicated above may in certain instances prove possible or desirable. In any case, the amount used is substantial and effective at least to improve the resistance of the newly-cured coating to thermal shock and/or to improve the adhesion to the cured ceramic paint of a second coat of ceramic paint. Silica or the like need not be applied to the final coat of paint before curing.

The manner of curing the substance-treated ceramic paint will naturally depend upon the paint formulation used, the thickness of the coating, the need to avoid overrapid heating that might cause substantial pinholing, and the need to avoid curing temperatures high enough to cause flaking. In most instances, temperatures of about 200° to 500° F are satisfactory. Moreover, the time of the curing operation may vary widely, from several seconds to a few days, depending upon the same factors as mentioned above. The above-mentioned ceramic paint "Lithoid G-125" may be cured without fusing by baking for about five minutes at about 250°–500° F. In general, the substance-treated ceramic paint is cured by using about the same conditions as for the same ceramic paint not treated with finely-divided substance in accordance with the invention. As will be seen, however, it will sometimes be possible to use higher temperatures such as 900° F without encountering flaking. Some formulations of ceramic paint will cure at room temperture, given enough time, e.g., one hour to one day.

After being cured as indicated above, the painted and treated object may be air-cooled. This represents an advance in the art and an advantage over known methods of painting objects with ceramic paint, in that it has hitherto sometimes been necessary after curing to slow-cool, e.g., in a furnace, to avoid cracking.

The ceramic paint "Lithoid G-125" is composed of 50% vehicle and 50% solids having the following chemical compositions:

|  | % by Volume |  | % by Volume |
|---|---|---|---|
| $SiO_2$ | 48.0 | $FeCrO_2$ | 2.5 |
| $Al_2O_3$ | 11.0 | $Na_2O$ | 0.238 |
| $K_2O$ | 10.0 | $MgO$ | 0.09 |
| $TiO_2$ | 5.0 | $CrO$ | 0.05 |
| $Fe_2O_3$ | 1.0 | $CuO$ | 0.002 |
| $CuCrO_2$ | 2.5 | $NiO$ | 0.002 |

The ceramic paint "Lithoid C-ZS" is also composed of 50% vehicle and 50% solids which have the following chemical composition:

|  | % by Volume |
|---|---|
| $SiO_2$ | 20 |
| $MgO$ | 10 |
| $Al_2O_3$ | 10 |
| $ZrSiO_3$ | 5 |

The color used in both the above coatings is either a cobalt or chrome ore compound. The vehicle of both above ceramic paints is a mixture of submicroscopic fibrous crystals of $SiO_2$ and $Al_2O_3$, i.e., $AlOOH$, to form an acidic vehicle with $SiO_2$ and $AlOOH$ in an aqueous colloidal suspension. Thixotropic qualities must be adjusted by increasing pH to 11. The high pH creates solubility of the 5 to 10 millimicron particles of $SiO_2$ and $Al_2O_3$ to form silicates of the same and includes silicates from existing impurities of sodium and potassium. This creates a reactive form of aluminum silicate.

The function of the above-described vehicle in "Lithoid G-125" ceramic paint is to create a chemical reaction during twenty-one days in compounding that permits all of the solids content of the ceramic paint to withstand continuous temperatures of 2800° F and will not crack or spall on cooling down to ambient or room temperature. In the "Lithoid C-ZS" ceramic paint, the vehicle creates a chemical reaction during 21 days in compounding that permits all the solids content of the ceramic paint to withstand a temperature of 5000° F continuously and will not crack or spall on cooling down to ambient or room temperature. The vehicle acts as a binder for the solids during curing or baking. During curing, the vehicle releases a percentage of chemically-bound water at each temperature range and three layers of ceramic are formed to make a single coat of ceramic paint. These layers consist of an adhesion layer that makes a chemical and mechanical bond to metals or refractories, a center pulp layer that permits variations in expansion and contraction, and an outer case-hardened layer that attains a hardness that is greater than low carbon steel.

The term "curing" of the ceramic paints means the temperatures required for baking or curing to form a solid continuous film of coating on a substrate material such as metal. The cured ceramic paint is not a fused coating because curing takes place at a temperature of 750° F or lower. Such temperatures are significantly lower than the required melting temperature for fusing porcelain and other well-known ceramics. Curing or baking temperatures cycles are used to be sure water does not bubble out and create a rough surface to the ceramic coating. A typical example of desired curing temperature cycles is as follows:

200° F for 10 minutes
250° F for 10 minutes
350° F for 15 minutes
500° F for 10 minutes The article is then taken out of the oven and the ceramic coating is ready to use. The curing temperatures for the Lithoid ceramic coatings are unique because of the low temperature cure required. In comparison, ceramics and porcelain cure at a temperature within the range of 1800° to 2800° F. However, there is one known porcelain that cures at 1100° F.

In accordance with a preferred practice of the invention, at least a second and possibly also a third or further coat of ceramic paint is applied to the substrate so painted, treated and cured. In making a coating of five or six layers, it will be preferably to use very finely-divided material, e.g., −40 microns, on the first layer or two, and then a somewhat coarser finely-divided material, e.g., −100 microns, for the remaining coats. Alternatively, the coarse material may be used for the first few coats and the finer material later.

Objects provided with multi-layer ceramic paint coatings in accordance with the invention will find use in one or more of many applications, among which may be mentioned the one discussed below, but mention of certain uses is not to be taken as denying or disparaging others omitted in the interest of brevity.

The refractory linings of pots used for the hot-dip galvanizing, terne-coating, or aluminizing of steel strip give substantially longer service life when painted with a multi-layer ceramic paint coating in accordance with the invention.

In exhaust systems associated with internal combustion engines, manifolds and mufflers painted interiorly and exteriorly with multi-layer ceramic paint coatings of the invention have substantially greater service life than the corresponding single-coated or uncoated parts.

In pumps for water or chemicals, valves and intake or discharge lines painted in accordance with the invention have outstanding service lines.

The invention also finds use in such other places in the steel industry (and other metal industry) as refining-furnace roofs and linings; bottoms of ladles for molten metal; tundishes, runs and molds of continuous-casting equipment; and inner covers in mill box annealing furnaces. Multiple coatings may be provided in electrical industry equipment to obtain greater dielectric strength. Uses for the invention in food-processing equipment, space-vehicle exterior and interior parts, storage tanks, heat-transfer equipment, and elsewhere will also be apparent to those skilled in the art.

As an aid to the understanding thereof, the invention described above may be illustrated by the following specific examples, which are not to be interpreted in a limiting sense.

EXAMPLE I

A specimen 1 × 2 inches of 20-gage AISI Type 1020 carbon steel was coated with a ceramic paint such as that sold by Industrial Infra-Red, Inc. of Sharon, Pennsylvania, under the designation "Lithoid G-125", the thickness of the wet coating being about 0.005 inch. Within 5 to 10 minutes after the ceramic paint had been applied to the steel specimen, i.e., while the ceramic paint was still wet, there was further applied to the specimen, using a flock gun, finely-divided silica powder of 40 microns maximum dimension, as much silica powder being used as the wet painted surface would absorb. The ceramic paint coating was then cured by being baked for about five minutes at about 250° F, 5 minutes at 350° F, and then 5 minutes at 500° F. The specimen was removed from the oven and permitted to cool in air, exhibiting no cracking in the air-cooling. A second coat of ceramic paint of the same kind was then applied and cured, with the result that there was produced a specimen exhibiting no cracking, good adhesion of the second layer of paint to the first, good thermal conductivity, and excellent resistance to oxidation and various chemical media at temperatures up to about 500° F.

EXAMPLE II

Example I was repeated, except that after curing of the silica-treated first layer of ceramic paint, the specimen was heated to about 900° F and then permitted to cool. No flaking was observed.

EXAMPLE III

Example I was repeated, except that there was used as a substrate a specimen of aluminum 1 × 2 × 0.035 inches. Similar results were obtained.

EXAMPLE IV

To a specimen of aluminum as described in Example III, there was applied a coating of about 0.005 inch thick of a ceramic paint such as that sold by Industrial Infra-Red, Inc. of Sharon, Pennsylvania, under the designation "Lithoid G-125". There was then sprinkled on the specimen a mixture of equal parts by weight of silica and polytetrafluoroethylene, the material being in finely-divided form, i.e., about 40 microns maximum dimension. The specimen was cured by baking at about 200° F for 10 minutes, 400° F for 10 minutes, and then 750° F for 10 minutes. After being cooled, the specimen had applied to it a second coat of the same ceramic paint, and while the paint was wet, there was applied to the surface thereof polytetrafluoroethylene in finely-divided form. The specimen was again cured as described above. There was thus produced a multi-layer coating of polytetrafluoroethylene and ceramic paint upon a substrate of metal of good heat conductivity. Moreover, the specimen exhibited good resistance to abrasion, as evidenced by not being noticeably scratched when abraded with the edge of a piece of sheet metal.

EXAMPLE V

To a specimen of tantalum metal sheet having dimensions of 1 × 2 × 0.035 inches, there was applied by brushing a coating about 0.005 inch thick when wet of a ceramic paint such as that sold by Industrial Infra-Red, Inc, of Sharon, Pennsylvania, under the designation "Lithoid C-ZS". While the paint coat was wet, there was applied to the painted surface of the specimen, by means of a flock gun, zirconium metal powder of 40 microns maximum dimension. The paint was cured by baking the specimen for 5 minutes at 250° F, 5 minutes at 350° F, and then 5 minutes at 500° F. A second coat of the same ceramic paint was then applied and then cured by baking as described above. There was thus produced a tantalum metal sheet specimen having a multi-layer ceramic-paint coating, the second layer adhering well to the first.

As used in the following claims, the term "in finely-divided form" will be understood as referring to material with a particle size of 100 microns maximum dimension.

EXAMPLE VI

To one face of a chrome-magnesite brick about 4 × 13 × 2 inches there was applied a coating about 0.005 inch thick of a ceramic paint such as that sold commercially as "Lithoid C-ZS" by Industrial Infra-Red, Inc. of Sharon, Pennsylvania. To the paint-wet surface, there was applied, using a flock gun, −100 zirconium powder, as much being used as the wet painted surface would absorb. The ceramic paint coating was then cured by being baked for about one hour in an oven at 500° F. After being air-cooled, the brick was then given a second coat of the same ceramic paint, which was then cured in the same way. The brick was tested by being subjected to the action of an acetylene torch, no spalling being observed.

Aqueous dispersions, i.e., water-based dispersions, of fluorocarbon resins or other types of resins are suitable to form a ceramic coating according to the present invention. The fluorocarbon resins used in successful tests of the present invention include:

1. Fluorinated ethylene propylene - FEP, sold under the trademark TEFLON by E. I. du Pont de Nemours & Company used in powdered form and as a water-based dispersion.
2. TFE - fluorocarbon resin - T-30, sold under the trademark TEFLON by E. I. du Pont de Nemours & Company and used as a liquid dispersion.
3. Tetrafluoroethylene - TFE-850 series, sold under the trademark TEFLON by E. I. du Pont de Nemours & Company used in powdered form and in a liquid dispersion form known as polytetrafluoroethylene.
4. Fluoropolymer - ETFE, sold under the trademark TEFZEL by E. I. du Pont de Nemours & Company and used in powdered form.
5. Tetrafluoroethylene - GP-2, sold under the trademark FLUON by ICI America, Inc. and used in powdered form and as an aqueous dispersion.
6. Tetrafluoroethylene - sold under the trademark HALON by Allied Chemicals Corporation and used in powdered form and as a water-base dispersion.
7. Tetrafluoroethylene - Tetran-30, sold by Pennwalt Chemical Corporation and used in powdered form and as an aqueous dispersion.
8. Polytetrafluoroethylene - sold under the trademark VYDAX by E. I. du Pont de Nemours & Company and used in powdered form and as a water-base dispersion.

A polymer, polyphenylene sulfide, sometimes called PPS, can be used in the same manner as the fluorocarbons and applied in powdered form or as a water-base dispersion to form a ceramic coating according to the present invention. Polyphenylene sulfide is sold by Phillips Petroleum under the trademark RYTON.

Two percent to 7% by volume of an anionic or non-ionic wetting agent, e.g., TRITON X-100 (Trademark) sold by Rohm & Haas Company or ULTRAWET (Trademark) sold by Arco Chemical Company, is required in a water-base fluorocarbon dispersion with the pH adjusted to lie between 8 to 11 for compatibility with the ceramic paint. Smooth coatings are obtained by using fluorocarbon resin particles of 0.05 micron to 2.0 microns. Fluorocarbon resin particles of 44 microns have been successfully used for test purposes. When a water-base fluorocarbon dispersion is used to form a ceramic coating according to the present invention, the surface of a metal substrate is prepared by heating the metal to 800° F to remove any contaminants and then the surface is contacted by a grit blast using 80 to 200 grit size of aluminum oxide to create a profile. The previously-described ceramic paint is applied as either a thin or thick coating of about ½ mil to 3 mils thickness and may be a discontinuous coat of 50% to 75% coverage. Pure ceramic paint or a paint mixture formed by adding 10% to 40% by volume if fluorocarbon resin to the ceramic paint may be used to form this coating. The coating makes a chemical as well as a mechanical bond to the prepared substrate. A second coat mixed with liquid dispersions or powders of fluorocarbon resins as identified hereinabove is applied, if desired, to the first coating while it is still wet. The second coating can be the final coat; however, more coats of the same water-base fluorocarbon dispersion can be applied by allowing air-drying times between coats as determined by the disappearance of the wet sheen from the coated surface. As desired, powdered or a water-base dispersion of fluorocarbon resin is applied to the paint-wetted surface after each coating of paint. A top coat of fluorocarbon resin, ½ mil to 3 mils in thickness, is then applied. The coated article is cured at a temperature of 750° F or below according to the typical curing temperature cycles as previously described. However, the coated article may be cured more rapidly. For example, the coated article may be cured by elevating its temperature at the rate of 30° to 60° F per minute. By increasing the temperature of the coated article at this rate, the ceramic coating is cured within 15 to 20 minutes.

The more fluorocarbon resins applied in the paint mixture and directly to the wet surface of the coating prior to curing, the softer the cured coating but without mud cracking or other adverse effects. The aforementioned wetting agent is used to properly wet fluorocarbon powder whereby the powder will sink into and become an integral part of the coating. The ceramic coating of the present invention forms a dependable bond on substrate metals while greatly increasing the structural strength of the coating. More specifically, the ceramic paint forms a chemical bond with the oxide which forms under heat (during the curing process) on the surface of the metal substrate. The only known metal that does not form a suitable oxide is molybdenum. The oxide on the metal surface is a non-flaking and tightly adhering layer. A desired degree of hardness, abrasion resistance or corrosion resistance can be obtained by using an inert or other material described hereinbefore to form part of a composite ceramic coating.

While I have shown and described herein certain embodiments of my invention, I intend to cover as well any change or modification therein which may be made without departing from the spirit and scope of the invention.

I claim as my invention:

1. An article of manufacture comprising a substrate having thereon a first coat or layer of ceramic paint having a pH level of at least about 11 and including a vehicle with chemically-bound water and an aqueous colloidal suspension of silica and alumina having a particle size within the range of 5 to 10 millimicrons thus creating a reactive form of aluminum silicate due to said pH level to produce a paint-wet surface, said surface having partly embedded therein an effective number of particles of finely-divided substance stable at the temperature of intended use, said ceramic paint being cured after heating said substrate, ceramic paint and particles to 250°–750° F to release water including said chemically-bound water from the vehicle of said ceramic paint without fusing said ceramic paint.

2. An article as defined in claim 1, characterized in that said particles are of a substance selected from the group consisting of silica, the rare earths, metal elements, and the oxides, carbides, nitrides, borides, silicides, and sulfides of metal elements, polymers, resins and polytetrafluoroethylene.

3. An article as defined in claim 2, characterized in that said particles are of silica.

4. An article as defined in claim 2, characterized in that said ceramic paint after curing remains infusible to withstand environments having temperatures of about 4500°–6300° F and said particles are of refractory-metal powder.

5. The article as defined in claim 1, characterized in that said particles are selected from the group consisting of fluorinated polyethylene propylene, and polyphenylene sulfide.

6. An article as defined in claim 1 characterized by a second coat or layer of ceramic paint capable of being cured by being heated at 250°–750° F to release water including said chemically-bound water from the vehicle of said ceramic paint to render it infusible, said second coat or layer of ceramic paint having partly embedded in the inner surface thereof said particles.

7. An article of manufacture comprising a substrate having thereon a layer of ceramic paint having a pH level of at least about 11 and including a vehicle with chemically-bound water and an aqueous colloidal suspension of silica and alumina having a particle size within the range of 5 to 10 millimicrons thus creating a reactive form of aluminum silicate due to said pH level to produce a paint-wet surface, said surface having an effective number of particles of finely-divided substance stable at the temperature of intended use, said particles being selected from the group consisting of fluorinated polyethylene propylene, polyphenylene sulfide and polytetrafluoroethylene, said ceramic paint being cured after heating said substrate, ceramic paint and particles to 250°–750° F to release water including said chemically-bound water from the vehicle of said ceramic paint without fusing said ceramic paint.

8. A method of coating which comprises applying to a solid substrate a coat of ceramic paint having a pH level of at least about 11 and containing a vehicle of chemically-bound water and an aqueous colloidal suspension of silica and alumina having a particle size within the range of 5 to 10 millimicrons thus creating a reactive form of aluminum silicate due to said pH level to produce a paint-wet surface, applying to said paint-wet surface a finely-divided substance stable at the temperature of intended use, said finely-divided substance being aqueously wettable and selected from the group consisting of fluorinatd polyethylene propylene, polyphenylene sulfide and polytetrafluoroethylene, and then curing said ceramic paint by heating it to a temperature of 750° F or below to release water including said chemically-bound water from the vehicle of said ceramic paint without fusing said ceramic paint.

9. The method according to claim 8 wherein prior to applying onto a solid substrate, said ceramic paint further contains 10%–40% by volume of an aqueous, wettable and finely-divided substance selected from the group consisting of fluorinated polyethylene propylene, polyphenylene sulfide and polytetrafluoroethylene.

10. The method according to claim 9 wherein said finely-divided substance consists of particles lying within the range of 0.05 micron to 44 microns in size, and wherein 2% to 7% of a wetting agent is combined with said finely-divided substance.

11. The method according to claim 8 wherein a plurality of successive coats of ceramic paint each including said finely-divided substance is formed one on top of a previous coat prior to curing said ceramic paint by heating.

12. A method of coating which comprises applying to a solid substrate a coat of ceramic paint having a pH level of at least about 11 and containing a vehicle of chemically-bound water and an aqueous colloidal suspension of silica and alumina having a particle size within the range of 5 to 10 millimicrons thus creating a reactive form of aluminum silicate due to said pH level to produce a paint-wet surface and a finely-divided substance stable at the temperature of intended use, said finely-divided substance being aqueously wettable and selected from the group consisting of fluorinated polyethylene propylene, polyphyenylene sulfide and polytetrafluoroethylene, and then curing said ceramic paint by heating it to a temperature of 750° F or below to release water including said chemically-bound water from the vehicle of said ceramic paint without fusing said ceramic paint.

13. The method according to claim 12 wherein said ceramic paint contains 10%–40% by volume of said aqueous, wettable and finely-divided substance selected from the group consisting of fluorinated polyethylene propylene, polyphenylene sulfide, and polytetrafluoroethylene.

14. The method according to claim 13 wherein said finely-divided substance consists of particles lying within the range of 0.05 micron to 44 microns in size, and wherein 2% to 7% of a wetting agent is combined with said finely-divided substance.

15. The method according to claim 12 wherein a plurality of successive coats of ceramic paint each including said finely-divided substance is formed one on top of a previous coat prior to curing said ceramic paint by heating.

16. The method according to claim 12 including the further step of applying a finely-divided substance stable at the temperature of intended use to said paint-wet surface prior to said curing the ceramic paint, said finely-divided substance being aqueously wettable and selected from the group consisting of fluorinated polyethylene propylene, polyphenylene sulfide and polytetrafluoroethylene.

17. A method of coating which comprises applying to a solid substrate a coat of ceramic paint having a pH level of at least about 11 and including a vehicle with chemically-bound water and an aqueous colloidal suspension of silica and alumina having a particle size within the range of 5 to 10 millimicrons thus creating a reactive form of aluminum silicate due to said pH level to produce a paint-wet surface, applying to said paint-wet surface a finely-divided substance stable at the temperature of intended use, and then curing said ceramic paint by heating said solid substrate, ceramic paint and finely-divided substance to a temperature in the range of 200°–750° F to release water including said chemically-bound water from the vehicle of said ceramic paint without fusing said ceramic paint.

18. A method as defined in claim 17, characterized in that said substance is finely-divided silica.

19. A method as defined in claim 17 wherein said finely-divided substance is inorganic and the additional and subsequent step of applying above said ceramic paint after it has been cured a second coat of ceramic paint and then curing said second ceramic paint coating.

20. A method as defined in claim 17, characterized in that said substance is finely-divided silica.

21. A method as defined in claim 17, characterized in that said finely-divided substance is selected from the group consisting of silica, the rare earths, metal elements, and the oxides, carbides, nitrides, borides, silicides, and sulfides of metal elements.

22. A method as defined in claim 17, characterized in that said finely-divided substance is selected from the group consisting of polymers and resins.

23. A method as defined in claim 21, characterized by the additional and subsequent step of applying above said ceramic paint after it has been cured a second coat of ceramic paint and then curing said second ceramic paint coating.

24. A method comprising using a wet coat of ceramic paint to adhere a finely-divided substance stable at the temperature of intended use onto a solid substrate, said ceramic paint having a pH level of at least about 11 and including a vehicle with chemically-bound water and an aqueous colloidal suspension of silica and alumina having a particle size within the range of 5 to 10 millimicrons thus creating a reactive form of aluminum silicate due to said pH level, and then curing said ceramic paint by heating said substrate, ceramic paint and finely-divided substance to a temperature in the range of 250° F to 750° F to release water including said chemically-bound water from the vehicle of said ceramic paint without fusing said ceramic paint.

* * * * *